US012797786B2

(12) United States Patent
Matsumoto

(10) Patent No.: US 12,797,786 B2
(45) Date of Patent: Nov. 17, 2026

(54) GAS SEPARATION MEMBRANE AND METHOD FOR MANUFACTURING GAS SEPARATION MEMBRANE

(71) Applicant: SEIKO EPSON CORPORATION, Tokyo (JP)

(72) Inventor: Yasutaka Matsumoto, Suwa (JP)

(73) Assignee: SEIKO EPSON CORPORATION (JP)

( * ) Notice: Subject to any disclaimer, the term of this patent is extended or adjusted under 35 U.S.C. 154(b) by 290 days.

(21) Appl. No.: 18/675,230

(22) Filed: May 28, 2024

(65) Prior Publication Data

US 2024/0399299 A1 Dec. 5, 2024

(30) Foreign Application Priority Data

May 29, 2023 (JP) ................................. 2023-087717

(51) Int. Cl.
*B01D 53/22* (2006.01)
*B01D 71/70* (2006.01)

(52) U.S. Cl.
CPC ........... *B01D 53/228* (2013.01); *B01D 71/70* (2013.01); *B01D 2257/504* (2013.01); *B01D 2258/02* (2013.01)

(58) Field of Classification Search
CPC .. B01D 53/228; B01D 71/70; B01D 67/0002; B01D 2257/504; B01D 2258/02
See application file for complete search history.

(56) References Cited

U.S. PATENT DOCUMENTS 4,950,314 A * 8/1990 Yamada ................. B01D 69/02 96/14
5,286,280 A 2/1994 Chiou
(Continued)

FOREIGN PATENT DOCUMENTS

JP S59-225703 A 12/1984
JP S60-031802 A 2/1985
(Continued)

OTHER PUBLICATIONS

J. Buijten et al., "Ozone-Initiated In Situ Cross-Linking of Non-Polar and Medium-Polar Silicone Stationary Phases for Capillary Gas Chromatography", Journal of Chromatography, Elsevier Science Publishers, Amsterdam, 1984, pp. 143-156.

*Primary Examiner* — Charles G Freay
(74) *Attorney, Agent, or Firm* — Harness, Dickey & Pierce, P.L.C.

(57) ABSTRACT

A gas separation membrane for separating carbon dioxide from a mixed gas containing the carbon dioxide contains an organopolysiloxane containing a first a structural unit represented by the following formula (1a) and a first b structural unit represented by the following formula (1b).

(1a)

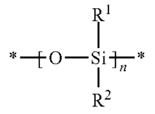

(1b)

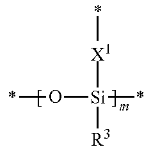

[In the formula (1a) and the formula (1b), $R^1$, $R^2$, and $R^3$ each independently represent a hydrogen atom, an alkyl group, an alkenyl group, an alkoxy group, an alkenyloxy group, an aryl group, or an aryloxy group. $X^1$ represents a crosslinked chain containing an amide bond, and is shared
(Continued)

by two of the first b structural units. * represents a bond. n and m are molar ratios of the first a structural unit and the first b structural unit.]

9 Claims, 1 Drawing Sheet

(56) References Cited

U.S. PATENT DOCUMENTS

| | | | | |
|---|---|---|---|---|
| 7,361,721 | B1 | 4/2008 | O'Lenick, Jr. | |
| 10,507,437 | B2 * | 12/2019 | Sano | B32B 5/028 |
| 2017/0333835 | A1 | 11/2017 | Sano et al. | |
| 2018/0021738 | A1 * | 1/2018 | Fujikawa | C08G 77/16<br>525/477 |
| 2018/0133663 | A1 | 5/2018 | Liu et al. | |
| 2018/0221813 | A1 | 8/2018 | Yang et al. | |

FOREIGN PATENT DOCUMENTS

| | | | |
|---|---|---|---|
| JP | H01-111420 | A | 4/1989 |
| JP | H03-157127 | A | 7/1991 |
| JP | H04-022429 | A | 1/1992 |
| JP | H06-269650 | A | 9/1994 |
| JP | 2018-015678 | A | 2/2018 |

* cited by examiner

GAS SEPARATION MEMBRANE AND METHOD FOR MANUFACTURING GAS SEPARATION MEMBRANE

The present application is based on, and claims priority from JP Application Serial Number 2023-087717, filed May 29, 2023, the disclosure of which is hereby incorporated by reference herein in its entirety.

BACKGROUND

1. Technical Field

The present disclosure relates to a separation membrane and a method for manufacturing the gas separation membrane.

2. Related Art

In order to implement carbon neutrality or carbon minus, a technique is being considered to absorb and collect carbon dioxide discharged from thermal power plants, boiler facilities, or the like, and carbon dioxide in the atmosphere. As the technique, there has been known a membrane separation method of separating carbon dioxide using a gas separation membrane.

For example, JP-A-2018-15678 discloses a gas permeable membrane which is a polymer membrane obtained by crosslinking, with metal atoms, main chains of polymers each having a siloxane bond (—Si—O—Si—) as a main chain. Since such a gas permeable membrane is a membrane of polymers each having a siloxane bond as a main chain, permeability of carbon dioxide gas is higher than permeability of nitrogen gas. Since the gas permeable membrane includes metal atoms as a constituent component, mechanical strength is also excellent.

JP-A-2018-15678 is an example of the related art.

In the gas permeable membrane described in JP-A-2018-15678, separability from nitrogen is determined based on the permeability of carbon dioxide that is derived from a siloxane bond. However, an affinity of a siloxane bond with carbon dioxide is not sufficient. Therefore, the gas permeable membrane described in JP-A-2018-15678 has room for improvement in gas selection ratio of carbon dioxide.

In the gas permeable membrane described in JP-A-2018-15678, since polymers are crosslinked with each other through metal atoms, a mechanical freedom degree of a frame structure is low. Since the mechanical freedom degree of the frame structure is considered to affect gas permeability, the gas permeable membrane described in JP-A-2018-15678 has room for improvement even in the permeability of carbon dioxide.

Therefore, an object is to implement a gas separation membrane capable of achieving both gas selection ratio of carbon dioxide and gas permeability of carbon dioxide.

SUMMARY

A gas separation membrane according to an application example of the present disclosure is a gas separation membrane for separating carbon dioxide from a mixed gas containing the carbon dioxide. The gas separation membrane contains an organopolysiloxane containing a first a structural unit represented by the following formula (1a) and a first b structural unit represented by the following formula (1b).

(1a)

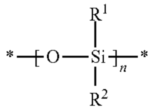

(1b)

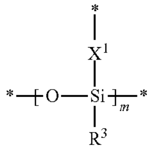

[In the formula (1a) and the formula (1b), $R^1$, $R^2$, and $R^3$ each independently represent a hydrogen atom, an alkyl group, an alkenyl group, an alkoxy group, an alkenyloxy group, an aryl group, or an aryloxy group. $X^1$ represents a crosslinked chain containing an amide bond, and is shared by two of the first b structural units. * represents a bond. n and m are molar ratios of the first a structural unit and the first b structural unit.]

A gas separation membrane according to an application example of the present disclosure is a gas separation membrane for separating carbon dioxide from a mixed gas containing the carbon dioxide. The gas separation membrane contains an organopolysiloxane containing a second a structural unit represented by the following formula (2a) and a second b structural unit represented by the following formula (2b).

(2a)

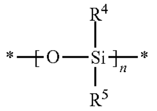

(2b)

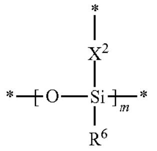

[In the formula (2a) and the formula (2b), one or more of $R^4$, $R^5$, and $R^6$ represent an alkyl group, and the rest represents an aryl group. $X^2$ represents a crosslinked chain containing a carboxylate ester bond, and is shared by two of the second b structural units. * represents a bond. n and m are molar ratios of the second a structural unit and the second b structural unit.]

A method for manufacturing a gas separation membrane according to an application example of the present disclosure is a method for manufacturing a gas separation membrane for separating carbon dioxide from a mixed gas containing the carbon dioxide. The method includes reacting an amino-modified silicone containing a third a structural unit represented by the following formula (3a) and a third b structural unit represented by the following formula (3b) with a dicarboxylic acid.

(3a)

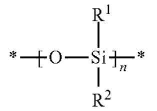

-continued (3b)

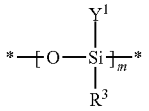

[In the formula (3a) and the formula (3b), $R^1$, $R^2$, and $R^3$ each independently represent a hydrogen atom, an alkyl group, an alkenyl group, an alkoxy group, an alkenyloxy group, an aryl group, or an aryloxy group. $Y^1$ represents an aminoalkyl group. * represents a bond. n and m are molar ratios of the third a structural unit and the third b structural unit.]

A method for manufacturing a gas separation membrane according to an application example of the present disclosure is a method for manufacturing a gas separation membrane for separating carbon dioxide from a mixed gas containing the carbon dioxide. The method includes reacting phenyl-modified silicones each containing a fourth a structural unit represented by the following formula (4a) and a fourth b structural unit represented by the following formula (4b) with each other.

(4a)

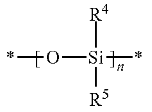

(4b)

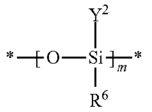

[In the formula (4a) and the formula (4b), one or more of $R^4$, $R^5$, and $R^6$ represent an alkyl group, and the rest represents an aryl group. $Y^2$ represents a phenyl group. * represents a bond. n and m are molar ratios of the fourth a structural unit and the fourth b structural unit.]

DESCRIPTION OF EMBODIMENTS

Hereinafter, a gas separation membrane and a method for manufacturing the gas separation membrane according to the present disclosure will be described in detail based on embodiments shown in the accompanying drawings.

1. First Embodiment

First, a configuration of a gas separation membrane according to a first embodiment will be described.

1.1. Configuration of Gas Separation Membrane

Figure 1:
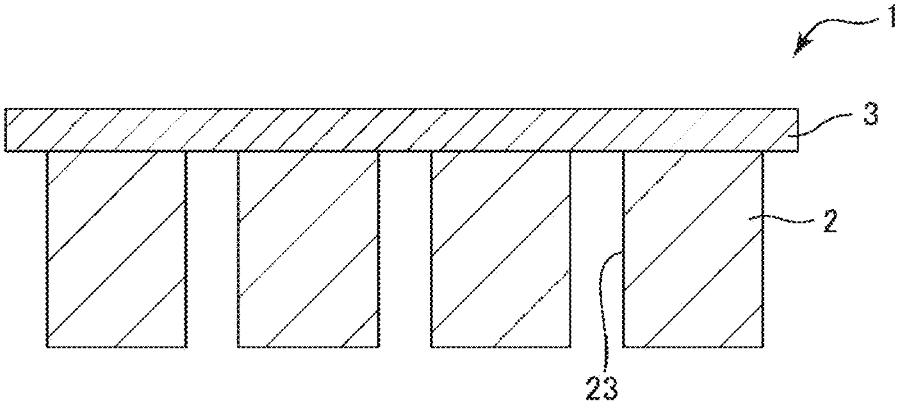
FIG. 1 is a cross-sectional view schematically showing a gas separation membrane according to a first embodiment.

FIG. 1 is a cross-sectional view schematically showing a gas separation membrane 1 according to the first embodiment.

The gas separation membrane 1 shown in FIG. 1 has a function of selectively allowing carbon dioxide to permeate therethrough from a mixed gas containing the carbon dioxide and a non-target component. The gas separation membrane 1 shown in FIG. 1 is a composite membrane including porous layers 2 and a separation layer 3. The non-target component refers to a gas component other than carbon dioxide that is contained in the mixed gas. Examples of the non-target component include nitrogen and methane, and nitrogen is particularly envisaged. Therefore, examples of the above-described mixed gas include a mixed gas of carbon dioxide and nitrogen. The gas separation membrane 1 is not limited to a composite membrane.

The porous layer 2 is a porous membrane having holes 23 shown in FIG. 1. Such a porous layer 2 has a good gas permeability and supports the separation layer 3. Accordingly, mechanical characteristics of the gas separation membrane 1 as a whole can be improved without impairing a good gas selection ratio of the separation layer 3.

The separation layer 3 is provided on one surface of the porous layer 2, and is formed of a polymer material that is denser (lower in porosity) than the porous layer 2. Such a separation layer 3 closes upper ends of the holes 23. The separation layer 3 has a good gas selection ratio that allows carbon dioxide in the mixed gas supplied upstream of the gas separation membrane 1 to selectively permeate downstream. Accordingly, the gas separation membrane 1 can separate carbon dioxide in the mixed gas. In the following description, an upper side of the gas separation membrane 1 shown in FIG. 1 is referred to as "upstream" or simply referred to as "upper", and a lower side thereof is referred to as "downstream" or simply referred to as "lower".

The gas separation membrane 1 according to the embodiment has a function of selectively allowing carbon dioxide to permeate therethrough, and characteristics thereof are quantitatively represented by a gas selection ratio. Specifically, when the non-target component is nitrogen, gas permeability of nitrogen in the gas separation membrane 1 is $R_{N2}$, and gas permeability of carbon dioxide in the gas separation membrane 1 is $R_{CO2}$. At this time, a gas selection ratio $R_{CO2}/R_{N2}$ of the gas separation membrane 1 is preferably 10 or more, and more preferably 20 or more and 50 or less. When the gas selection ratio $R_{CO2}/R_{N2}$ is within the above range, the gas separation membrane 1 can efficiently separate and collect carbon dioxide in the mixed gas.

When the gas selection ratio is less than the lower limit value, many non-target components such as nitrogen are mixed in the collected carbon dioxide. Therefore, when storing or using the collected carbon dioxide, economic efficiency and handleability thereof may deteriorate. On the other hand, the gas selection ratio may exceed the upper limit value, and in this case, it may be difficult to sufficiently increase the gas permeability of carbon dioxide in the gas separation membrane 1, and a manufacturing difficulty level or manufacturing cost of the gas separation membrane 1 that implements such a gas selection ratio may increase.

The gas permeability $R_{N2}$ of nitrogen in the gas separation membrane 1 and the gas permeability $R_{CO2}$ of carbon dioxide in the gas separation membrane 1 are each measured according to a gas permeability test method (Part 1: differential pressure method) defined in JIS K 7126-1:2006. A gas permeability measuring device is used for the measurement. Examples of the gas permeability measuring device include GTR-11A/31A manufactured by GTR TEC Corporation. In the device, gas that permeates through the gas separation membrane 1 is introduced into a gas chromatograph to measure the gas permeability of each component. Accordingly, each gas permeability of nitrogen and carbon dioxide can be measured.

In the gas separation membrane 1 according to the embodiment, the gas permeability $R_{CO2}$ of carbon dioxide is preferably 15 GPU or more, more preferably 100 GPU or more and 20000 GPU or less, and still more preferably 200 GPU or more and 15000 GPU or less. Accordingly, the gas separation membrane 1 capable of reducing an input amount of energy necessary for separation, specifically, reducing a pressure difference between pressures upstream and downstream of the gas separation membrane 1 can be implemented. When the gas permeability $R_{CO2}$ of carbon dioxide is less than the lower limit value, a large amount of energy is required for carbon dioxide separation, and economic efficiency may be lowered. On the other hand, when the gas permeability $R_{CO2}$ of carbon dioxide exceeds the upper limit value, it may be difficult to maintain a balance with the above-described gas selection ratio. The 1 GPU is $3.35\times10^{-10}$ $mol\cdot m^{-2}\cdot s^{-1}\cdot Pa^{-1}$.

The separation layer 3 is preferably in close contact with the porous layers 2. In the present description, the term "close contact" means that an adhesion interface between the separation layer 3 and the porous layers 2 has airtightness. Due to the airtightness, the separation layer 3 makes the holes 23 of the porous layer 2 independent from each other. That is, since there is no gap between the separation layer 3 and the porous layers 2, communication between the holes 23 via the gap can be prevented.

1.1.1. Porous Layer

As described above, the porous layer 2 is a porous membrane including the holes 23, and has a good gas permeability. The porous layer 2 has a rigidity higher than that of the separation layer 3, and is responsible for ensuring mechanical characteristics such as self-standing and durability of the gas separation membrane 1 as a whole. When the separation layer 3 has sufficient mechanical characteristics, the porous layer 2 may be omitted.

Examples of a constituent material of the porous layer 2 include a polymer material, a ceramic material, and a metal material. The constituent material of the porous layer 2 may be a composite material of these materials and other materials.

Examples of the polymer material include polyolefin resins such as polyethylene and polypropylene, fluorine-containing resins such as polytetrafluoroethylene, polyvinyl fluoride, and polyvinylidene fluoride, polystyrene, cellulose, cellulose acetate, polyurethane, polyacrylonitrile, polyphenylene oxide, polysulfone, polyethersulfone, polyimide, polyaramid, and nylon.

Examples of the ceramic material include alumina, cordierite, mullite, silicon carbide, and zirconia. Examples of the metal material include stainless steel.

Among them, the ceramic material is preferably used as the constituent material of the porous layer 2. Since the ceramic material has a high rigidity and is a sintered material, the ceramic material includes continuous holes. Therefore, by using the ceramic material as the constituent material of the porous layer 2, the gas separation membrane 1 that is excellent in mechanical characteristics and has a high gas permeability of carbon dioxide can be obtained.

A shape of the porous layer 2 may be a spiral shape, a tubular shape, a hollow fiber shape, or the like, in addition to a flat plate shape shown in FIG. 1.

An average thickness of the porous layer 2 is not particularly limited, and is preferably 1 μm or more and 3000 μm or less, more preferably 5 μm or more and 500 μm or less, and still more preferably 10 μm or more and 150 μm or less. Accordingly, the porous layer 2 has a necessary and sufficient rigidity to support the gas separation membrane 1. When the average thickness of the porous layer 2 is less than the lower limit value, the rigidity may be insufficient. On the other hand, when the average thickness of the porous layer 2 exceeds the upper limit value, the rigidity of the porous layer 2 may become too high, and handleability of the gas separation membrane 1 or adhesion of the separation layer 3 may decrease.

The average thickness of the porous layer 2 is an average value of thicknesses measured at 10 positions of the porous layer 2 in a stacking direction. The thickness of the porous layer 2 can be measured using, for example, a thickness gauge.

The porous layer 2 includes the holes 23, and an average inner diameter thereof is referred to as an "average hole diameter". The average hole diameter of the porous layer 2 is preferably 0.2 μm or less, more preferably 0.01 μm or more and 0.15 μm or less, still more preferably 0.01 μm or more and 0.09 μm or less, and particularly preferably 0.01 μm or more and 0.07 μm or less. Accordingly, the separation layer 3 can be prevented from slipping out downstream of the porous layer 2 while sufficiently ensuring the gas permeability of carbon dioxide in the porous layer 2. When the average hole diameter of the porous layer 2 is less than the lower limit value, the gas permeability of carbon dioxide in the porous layer 2 may decrease. On the other hand, when the average hole diameter of the porous layer 2 exceeds the upper limit value, the separation layer 3 may slip out downstream of the porous layer 2.

The average hole diameter of the porous layer 2 is measured by a through hole diameter evaluation device after the separation layer 3 is removed from the gas separation membrane 1 and the single porous layer 2 is taken out. Examples of the through hole diameter evaluation device include a perm porometer manufactured by PMI.

A porosity of the porous layer 2 is preferably 20% or more and 90% or less, and more preferably 30% or more and 80% or less. Accordingly, the porous layer 2 can achieve both good gas permeability and sufficient rigidity.

The porosity of the porous layer 2 is measured by the above-described through hole diameter evaluation device after the separation layer 3 is removed from the gas separation membrane 1.

1.1.2. Separation Layer

The separation layer 3 is formed at an upstream surface of the porous layer 2. The separation layer 3 is a substantially dense membrane and has a good affinity with carbon dioxide molecules. Due to the affinity, the separation layer 3 selectively allows carbon dioxide to permeate therethrough.

A constituent material of the separation layer 3 is, for example, an organopolysiloxane which is a copolymer containing a first a structural unit represented by the following formula (1a) and a first b structural unit represented by the following formula (1b).

(1a)

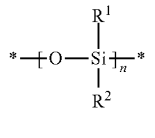

-continued (1b)

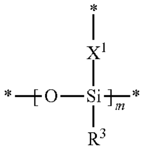

[In the formula (1a) and the formula (1b), $R^1$, $R^2$, and $R^3$ each independently represent a hydrogen atom, an alkyl group, an alkenyl group, an alkoxy group, an alkenyloxy group, an aryl group, or an aryloxy group. $X^1$ represents a crosslinked chain containing an amide bond, and is shared by two of the first b structural units. * represents a bond. n and m are molar ratios of the first a structural unit and the first b structural unit.]

The separation layer 3 formed of such an organopolysiloxane has a high affinity with carbon dioxide since the crosslinked chain contains an amide bond having an N atom and a C═O double bond. Therefore, such a separation layer 3 implements the gas separation membrane 1 having a high gas selection ratio of carbon dioxide. In the organopolysiloxane described above, main chains each containing a siloxane bond are crosslinked with each other via the crosslinked chain. Therefore, the organopolysiloxane described above can easily form a membrane and can easily improve mechanical characteristics of the membrane. Accordingly, the separation layer 3 can be made thinner, and thus the gas permeability of carbon dioxide in the separation layer 3 can be further increased. The separation layer 3 has both resistance to peeling and ability to follow deformation. Further, the separation layer 3 can be prevented from entering the holes 23.

The number of carbon atoms in the alkyl group constituting $R^1$, $R^2$, and $R^3$ is not particularly limited, and is preferably 1 or more and 6 or less, and more preferably 2 or more and 5 or less. The alkyl group may be linear or branched. One or more hydrogen atoms contained in the alkyl group may be substituted with a substituent. Examples of the substituent include an alkoxy group, an alkenyloxy group, a phenyl group, a hydroxyl group, a carboxyl group, an amino group, a halogen atom, and a thiol group. When substituted with a plurality of substituents, the substituents may be the same type of substituents or different types of substituents.

Specific examples of the alkyl group include a methyl group, an ethyl group, a propyl group, an isopropyl group, an n-butyl group, an isobutyl group, a t-butyl group, a pentyl group, an isoamyl group, a hexyl group, a benzyl group, a phenylethyl group, a 2-phenylpropyl group, a trifluoropropyl a carboxymethyl group, an group, aminomethyl group, and a hydroxyalkyl group.

Examples of the hydroxyalkyl group include a hydroxymethyl group, a hydroxyethyl group, a hydroxypropyl group, a hydroxyisopropyl group, a hydroxybutyl group, a hydroxyisobutyl group, and a hydroxyt-butyl group.

The number of carbon atoms in the alkenyl group constituting $R^1$, $R^2$, and $R^3$ is not particularly limited, and is preferably 2 or more and 6 or less. The alkenyl group may be linear or branched. One or more hydrogen atoms contained in the alkenyl group may be substituted with a substituent. Examples of the substituent include those similar to those for the alkyl group.

Specific examples of the alkenyl group include a vinyl group, a 1-propenyl group, a 2-propenyl group, a 1-methylvinyl group, a 2-methyl-1-propenyl group, a 1-butenyl group, a 2-butenyl group, a 3-butenyl group, a 1-pentenyl group, and a 1-hexenyl group.

The number of carbon atoms in the alkoxy group constituting $R^1$, $R^2$, and $R^3$ is not particularly limited, and is preferably 1 or more and 6 or less. An alkyl group moiety of the alkoxy group may be linear or branched. One or more hydrogen atoms contained in the alkoxy group may be substituted with a substituent. Examples of the substituent include those similar to those for the alkyl group.

Specific examples of the alkoxy group include a methoxy group, an ethoxy group, a propoxy group, an isopropoxy group, an n-butoxy group, an isobutoxy group, a t-butoxy group, a pentyloxy group, an isoamyloxy group, a hexyloxy group, a phenylmethoxy group, and a phenylethoxy group.

The number of carbon atoms in the alkenyloxy group constituting $R^1$, $R^2$, and $R^3$ is not particularly limited, and is preferably 2 or more and 6 or less. An alkenyl group moiety of the alkenyloxy group may be linear or branched. One or more hydrogen atoms contained in the alkenyloxy group may be substituted with a substituent. Examples of the substituent include those similar to those for the alkyl group.

Specific examples of the alkenyloxy group include a vinyloxy group, a 1-propenyloxy group, a 2-propenyloxy group, a 1-methylvinyloxy group, a 2-methyl-1-propenyloxy group, a 1-butenyloxy group, a 2-butenyloxy group, a 3-butenyloxy group, a 1-pentenyloxy group, and a 1-hexenyloxy group.

The aryl group constituting $R^1$, $R^2$, and $R^3$ may be a monocyclic ring, a condensed ring, or a group in which a plurality of aromatic rings are single-bonded. One or more hydrogen atoms contained in the aryl group may be substituted with a substituent. Examples of the substituent include an alkyl group, an alkenyl group, an alkoxy group, an alkenyloxy group, a carboxyl group, an amino group, a halogen atom, and a thiol group. When substituted with a plurality of substituents, the substituents may be the same type of substituents or different types of substituents.

Specific examples of the aryl group include a phenyl group, a tolyl group, a xylyl group, a methoxyphenyl group, an ethoxyphenyl group, a butoxyphenyl group, a naphthyl group, a dimethylnaphthyl group, an indenyl group, a biphenyl group, an anthryl group, a phenanthryl group, a pyrenyl group, a chrysenyl group, a naphthacenyl group, and a fluorenyl group.

An aryl group moiety of the aryloxy group constituting $R^1$, $R^2$, and $R^3$ may be a monocyclic ring, a condensed ring, or a group in which a plurality of aromatic rings are single-bonded. One or more hydrogen atoms contained in the aryloxy group may be substituted with a substituent. Examples of the substituent include those similar to those for the aryl group.

Specific examples of the aryloxy group include a phenoxy group, a tolyloxy group, a xyloxy group, a methoxyphenyloxy group, an ethoxyphenyloxy group, a butoxyphenyloxy group, a naphthyloxy group, and a dimethylnaphthyloxy group.

$R^1$, $R^2$, and $R^3$ each independently preferably represent an alkyl group or an aryl group, and more preferably represent an alkyl group or a phenyl group.

$X^1$ represents a crosslinked chain containing an amide bond, and is shared by two of the first b structural units. The amide bond is a bond represented by —C(═O)—N—. The amide bond contains a double bond of C═O and has a good affinity with carbon dioxide. The amide bond has a rigidity and provides flatness to the separation layer 3 by arranging atoms in the same plane. From such a viewpoint as well, the crosslinked chain containing the amide bond contributes to improvement in mechanical characteristics of the separation layer 3.

The amide bond may be directly bonded to Si atoms in the two first b structural units, or may be bonded via an alkylene group, an ether bond, or the like. That is, the crosslinked chain $X^1$ may contain the alkylene group, the ether bond, or the like together with the amide bond. The crosslinked chain $X^1$ may contain two or more amide bonds. Accordingly, the mechanical characteristics of the separation layer 3 can be further improved. Further, the crosslinked chain $X^1$ may be a straight chain containing an amide bond, or may be a branched chain containing a main chain containing an amide bond and a side chain branched therefrom.

n in the formula (1a) and m in the formula (1b) are each set appropriately such that a weight average molecular weight of the organopolysiloxane is preferably 100 or more and 100,000 or less, and more preferably 1,000 or more and 30,000 or less.

At this time, a ratio of m/(n+m) in the formula (1a) and the formula (1b) is not particularly limited, and is preferably more than 0 and less than 0.1, more preferably 0.001 or more and less than 0.1, and still more preferably 0.01 or more and 0.05 or less. When the ratio of m/(n+m) is within the above range, a ratio of the crosslinked chain in the organopolysiloxane can be optimized. As a result, the gas permeability of the separation layer 3 can be ensured while improving the mechanical characteristics of the separation layer 3.

When the ratio of m/(n+m) is less than the lower limit value, a ratio of the first b structural unit in the organopolysiloxane decreases, and the ratio of the crosslinked chain decreases. Therefore, the mechanical characteristics of the separation layer 3 may decrease. On the other hand, when the ratio of m/(n+m) exceeds the upper limit value, the ratio of the first b structural unit in the organopolysiloxane increases, and the ratio of the crosslinked chain increases. Therefore, the gas permeability of the separation layer 3 may decrease.

Examples of a terminal group of the organopolysiloxane include an alkyl group, a hydroxyl group, and an alkoxy group. A bond * of the first a structural unit is bonded to a bond * of the first a structural unit, a bond * of the O atom or the Si atom contained in the first b structural unit, the terminal group, or other structural units. A bond * of the O atom or the Si atom in the first b structural unit is bonded to a bond * of the first a structural unit, a bond * of the 0 atom or the Si atom contained in the first b structural unit, the terminal group, or other structural units. A bond * of the crosslinked chain $X^1$ in the first b structural unit is bonded to the Si atom of another first b structural unit.

In the organopolysiloxane, a bonding mode of the first a structural unit and the first b structural unit may be any of random copolymerization, alternating copolymerization, block copolymerization, and the like. A total content of the first a structural unit and the first b structural unit in the organopolysiloxane is preferably 60% or more, and more preferably 80% or more in terms of molar ratio.

An average thickness of the separation layer 3 is not particularly limited, and is preferably 1000 nm or less, more preferably 10 nm or more and 800 nm or less, still more preferably 30 nm or more and 500 nm or less, and particularly preferably 50 nm or more and 200 nm or less. Accordingly, the separation layer 3 has a sufficient gas permeability while ensuring a good gas selection ratio. As a result, the gas separation membrane 1 that has a good selective separability of carbon dioxide, and can reduce an input amount of energy necessary for separation, specifically, can reduce a pressure difference between pressures upstream and downstream of the gas separation membrane 1 can be implemented. When the average thickness of the separation layer 3 is less than the lower limit value, a probability of occurrence of defects in the separation layer 3 may increase, or the separation layer 3 may be easily broken afterwards. On the other hand, when the average thickness of the separation layer 3 exceeds the upper limit value, the gas permeability of carbon dioxide in the separation layer 3 may decrease, the input amount of energy necessary for separation may increase, and flexibility of the separation layer 3 may decrease.

The average thickness of the separation layer 3 is preferably 0.0050% or more and 1.0% or less, more preferably 0.010% or more and 0.50% or less, and still more preferably 0.030% or more and 0.30% or less, of the average thickness of the porous layer 2. Accordingly, since a ratio of the thickness of the two layers is optimized, the mechanical characteristics, the gas selection ratio, and the gas permeability of the gas separation membrane 1 can be satisfactorily balanced.

The average thickness of the separation layer 3 can be obtained, for example, by observing a cross section of the gas separation membrane 1 under magnification and averaging thicknesses at 10 locations. For the magnification observation, for example, a scanning electron microscope or a transmission electron microscope is used.

Any intermediate layer may be interposed between the separation layer 3 and the porous layer 2. The intermediate layer may have, for example, a function of increasing adhesion between the separation layer 3 and the porous layer 2, a function of preventing the separation layer 3 from entering the holes 23, and the like.

If necessary, any functional group may be introduced into an upstream surface of the separation layer 3 using a coupling agent or the like. By appropriately selecting the functional group, the affinity with carbon dioxide can be further increased.

1.2. Method for Manufacturing Gas Separation Membrane

Next, a method for manufacturing the gas separation membrane according to the first embodiment will be described.

Figure 2:
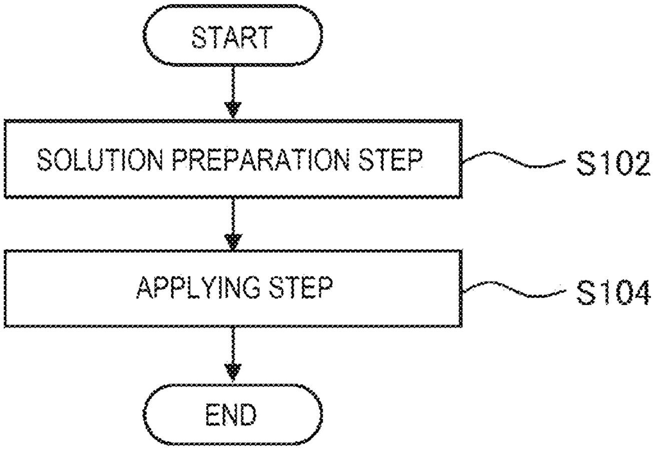
FIG. 2 is a process diagram showing a configuration of a method for manufacturing the gas separation membrane according to the first embodiment.

FIG. 2 is a process diagram showing a configuration of the method for manufacturing the gas separation membrane according to the first embodiment.

The manufacturing method shown in FIG. 2 includes a solution preparation step S102 and an applying step S104.

1.2.1. Solution Preparation Step

In solution preparation step S102, an amino-modified silicone and a dicarboxylic acid are mixed to prepare a solution.

Specifically, first, a dicarboxylic acid is put into a solvent to prepare a dicarboxylic acid-containing liquid. A concentration of the dicarboxylic acid in the dicarboxylic acid-containing liquid is not particularly limited, and is preferably 0.01 mass % or more and 1.0 mass % or less, and more preferably 0.05 mass % or more and 0.50 mass % or less.

Examples of the dicarboxylic acid include aliphatic dicarboxylic acids such as succinic acid, glutaric acid, adipic acid, pimelic acid, suberic acid, azelaic acid, and sebacic acid, and aromatic dicarboxylic acids such as phthalic acid, isophthalic acid, and terephthalic acid.

In the present step, a dicarboxylic acid having 2 or more and 8 or less carbon atoms is preferably used, a dicarboxylic acid having 3 or more and 6 or less carbon atoms is more preferably used, and an aliphatic dicarboxylic acid having 3 or more and 6 or less carbon atoms is still more preferably used. Accordingly, a length of the crosslinked chain can be optimized when a crosslinked structure is formed by crosslinking main chains of siloxane bonds via a crosslinked chain containing two amide bonds. As a result, the separation layer 3 that is excellent in mechanical characteristics and has both resistance to peeling and ability to follow deformation can be formed.

Examples of the solvent include alcohols such as methanol, ethanol, and propanol, and ethers such as diethyl ether, methyl tertiary butyl ether (MTBE), diisopropyl ether, and diphenyl ether.

Next, an amino-modified silicone is put into the dicarboxylic acid-containing liquid described above, followed by stirring. Accordingly, a solution for forming the separation layer 3 is prepared.

The amino-modified silicone is a silicone having an amino group in a side chain. The amino-modified silicone contains a third a structural unit represented by the following formula (3a) and a third b structural unit represented by the following formula (3b).

(3a)

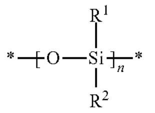

(3b)

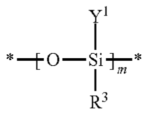

[In the formula (3a) and the formula (3b), $R^1$, $R^2$, and $R^3$ each independently represent a hydrogen atom, an alkyl group, an alkenyl group, an alkoxy group, an alkenyloxy group, an aryl group, or an aryloxy group. $Y^1$ represents an aminoalkyl group. * represents a bond. n and m are molar ratios of the third a structural unit and the third b structural unit.]

Such an amino-modified silicone contains an aminoalkyl group as a reactive group capable of reacting with the dicarboxylic acid. By reacting the amino-modified silicone with the dicarboxylic acid, a crosslinked chain containing an amide bond is formed, and a crosslinked structure is formed via the crosslinked chain. Accordingly, the separation layer 3 formed of the above-described organopolysiloxane can be formed.

The number of carbon atoms of the aminoalkyl group is not particularly limited, and is preferably 1 or more and 6 or less, more preferably 2 or more and 5 or less, and still more preferably 3 or more and 4 or less. Accordingly, a distance between the siloxane bond and the amino group can be secured, and flexibility of the produced crosslinked chain can be optimized. That is, an alkyl chain having a predetermined number of carbon atoms can be interposed between the siloxane bond and the amide bond in the produced crosslinked chain. As a result, the separation layer 3 that is excellent in mechanical characteristics and has both resistance to peeling and ability to follow deformation can be formed. Examples of the aminoalkyl group include an aminopropyl group and an aminobutyl group.

In the formula (3a) and the formula (3b), $R^1$, $R^2$, and $R^3$ are the same as $R^1$, $R^2$, and $R^3$ in the formula (1a) and the formula (1b) described above.

n in the formula (3a) and m in the formula (3b) are each set appropriately such that a weight average molecular weight of the organopolysiloxane is preferably 100 or more and 100,000 or less, and more preferably 1,000 or more and 30,000 or less.

Further, a ratio of m/(n+m) is the same as in the case of the formula (1a) and the formula (1b). That is, the ratio of m/(n+m) in the formula (3a) and formula (3b) is not particularly limited, and is preferably more than 0 and less than 0.1, more preferably 0.001 or more and less than 0.1, and still more preferably 0.01 or more and 0.05 or less. When the ratio of m/(n+m) is within the above range, a ratio of the crosslinked chain in the produced organopolysiloxane can be optimized. As a result, the gas permeability of the separation layer 3 can be ensured while improving the mechanical characteristics of the separation layer 3.

When the ratio of m/(n+m) is less than the lower limit value, a ratio of a structure derived from the third b structural unit in the organopolysiloxane decreases, and the ratio of the crosslinked chain decreases. Therefore, the mechanical characteristics of the separation layer 3 may decrease. On the other hand, when the ratio of m/(n+m) exceeds the upper limit value, the ratio of the structure derived from the third b structural unit in the organopolysiloxane increases, and the ratio of the crosslinked chain increases. Therefore, the gas permeability of the separation layer 3 may decrease.

Examples of a terminal group of the amino-modified silicone include an alkyl group, a hydroxyl group, and an alkoxy group. A bond * of the third a structural unit is bonded to a bond * of the third a structural unit, a bond * of the third b structural unit, the terminal group, or other structural units. A bond of the third b structural unit is bonded to a bond * of the third a structural unit, a bond * of the third b structural unit, the terminal group, or other structural units. A total content of the third a structural unit and the third b structural unit in the amino-modified silicone is preferably 60% or more, and more preferably 80% or more in terms of molar ratio.

An amount of the amino-modified silicone to be added to the dicarboxylic acid-containing liquid is appropriately set according to a content of the aminoalkyl group in the amino-modified silicone. Specifically, the ratio of m/(n+m) in the formula (3a) and the formula (3b) corresponds to the content of the aminoalkyl group. Therefore, the amount of the amino-modified silicone to be added may be adjusted such that an amount of the dicarboxylic acid contained in the dicarboxylic acid-containing liquid is the amount necessary and sufficient for reaction of the aminoalkyl group.

An optional additive may be added to the solution as necessary. Examples of the additive include a condensing agent, an antioxidant, a stabilizer, and a lubricant.

Among them, examples of the condensing agent include known amide condensing agents. Examples of the amide condensing agent include a carbodiimide condensing agent, a carbonyldiimidazole condensing agent, a triazine condensing agent, a phosphonium condensing agent, an uronium condensing agent, and a phosphoric acid condensing agent. By using such a condensing agent, reaction conditions when the amino-modified silicone is reacted with the dicarboxylic acid can be relaxed in the applying step S104 to be described later. That is, a reaction temperature can be lowered and a reaction time can be shortened as compared with a case where the condensing agent is not used. As a result, for example, even when the reaction temperature is lowered to about room temperature, sufficient reaction efficiency can be obtained, and thus production efficiency of the separation layer 3 can be increased.

Examples of the carbodiimide condensing agent include dicyclohexylcarbodiimide (DCC), N-ethyl-N'-3-dimethylaminopropylcarbodiimide (EDC), and diisopropylcarbodiimide (DIPC).

Examples of the carbonyldiimidazole condensing agent include carbonyldiimidazole (CDI), and 1,2,4-triazole (CDT).

Examples of the triazine condensing agent include 4-(4,6-dimethoxy-1,3,5-triazin-2-yl)-4-methylmorpholinium chloride (DMT-MM).

Examples of the phosphonium condensing agent include 1H-benzotriazol-1-yloxytris(dimethylamino)phosphonium hexafluorophosphate (BOP), and 1H-benzotriazol-1-yloxytripyrrolidinophosphonium hexafluorophosphate (py-BOP).

Examples of the uronium condensing agent include O-(7-azabenzotriazol-1-yl)-N,N,N',N'-tetramethyluronium hexafluorophosphate (HATU), O-(benzotriazol-1-yl)-N,N,N',N'-tetramethyluronium hexafluorophosphate (HBTU), and {{[(1-cyano-2-ethoxy-2-oxoethylidene)amino]oxy}-4-morpholinomethylene}dimethylammonium hexafluorophosphate (COMU).

Examples of the phosphoric acid condensing agent include diphenyl phosphate azide (DPPA) and diethyl phosphate cyanide (DEPC).

An amount of the condensing agent to be added can be adjusted such that a molar equivalent of an active group of the condensing agent is preferably 0.01 molar equivalents or more and 2.0 molar equivalents or less, and more preferably 0.05 molar equivalents or more and 1.5 molar equivalents or less, with respect to the amino group.

1.2.2. Applying Step

In the applying step S104, the prepared solution is applied on one surface of the porous layer 2. Accordingly, a coated membrane is obtained.

Examples of a coating method include a dipping method, a dripping method, an inkjet method, a dispenser method, a spraying method, a screen printing method, a coater coating method, and a spin coating method.

Next, the coated membrane is dried. Thus, the separation layer 3 is obtained. The drying may be natural drying, forced drying, or drying using both. The natural drying is, for example, a method of leaving at room temperature for 1 hour or more. Examples of the forced drying include a method of heating at a temperature of 50° C. or higher and 250° C. or lower for 10 minutes or more, a method of placing a coated membrane under reduced pressure, and a method of spraying a gas.

After the separation layer 3 is formed, a washing treatment may be performed as necessary. In the washing treatment, for example, a treatment of immersing the separation layer 3 in a washing liquid is used. Thereafter, the washing liquid is removed by drying.

As described above, the gas separation membrane 1 can be manufactured.

2. Second Embodiment

Next, a configuration of a gas separation membrane according to a second embodiment will be described.

Hereinafter, the second embodiment will be described. In the following description, differences from the first embodiment will be mainly described, and the description of similar matters will be omitted. The following description will be made based on the form shown in FIG. 1.

2.1. Configuration of Gas Separation Membrane

The gas separation membrane 1 according to the second embodiment is the same as the gas separation membrane 1 according to the first embodiment except that a structural unit contained in the organopolysiloxane constituting the separation layer 3 is different.

A constituent material of the separation layer 3 of the gas separation membrane 1 according to the second embodiment is an organopolysiloxane which is a copolymer containing a second a structural unit represented by the following formula (2a) and a second b structural unit represented by the following formula (2b).

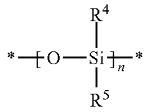

(2a)

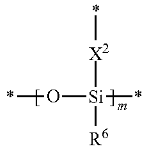

(2b)

[In the formula (2a) and the formula (2b), one or more of $R^4$, $R^5$, and $R^6$ represent an alkyl group, and the rest represents an aryl group. $X^2$ represents a crosslinked chain containing a carboxylate ester bond, and is shared by two of the second b structural units. * represents a bond. n and m are molar ratios of the second a structural unit and the second b structural unit.]

The carboxylate ester bond is an ester bond generated by a reaction between a carboxyl group and an aldehyde group or a dehydration condensation between carboxy groups. Since the carboxylate ester bond includes a C═O double bond, the carboxylate ester bond has a high affinity with carbon dioxide. Therefore, the separation layer 3 containing the crosslinked chain $X^2$ as described above implements the gas separation membrane 1 having a high gas selection ratio of carbon dioxide. In the organopolysiloxane described above, main chains each containing a siloxane bond are crosslinked with each other via the crosslinked chain $X^2$. Therefore, the organopolysiloxane described above can easily form a membrane and can easily improve mechanical characteristics of the membrane. Accordingly, the separation layer 3 has both resistance to peeling and ability to follow deformation. The separation layer 3 can be prevented from entering the holes 23. Further, the separation layer 3 can be made thinner, and thus the gas permeability of carbon dioxide in the separation layer 3 can be further increased.

The aryl group constituting $R^4$, $R^5$, and $R^6$ may be a monocyclic ring, a condensed ring, or a group in which a plurality of aromatic rings are single-bonded. One or more hydrogen atoms contained in the aryl group may be substituted with a substituent. Examples of the substituent include an alkyl group, an alkenyl group, an alkoxy group, an alkenyloxy group, a carboxyl group, an amino group, a halogen atom, and a thiol group. When substituted with a plurality of substituents, the substituents may be the same type of substituents or different types of substituents.

Specific examples of the aryl group include a phenyl group, a tolyl group, a xylyl group, a methoxyphenyl group, an ethoxyphenyl group, a butoxyphenyl group, a naphthyl group, a dimethylnaphthyl group, an indenyl group, a biphenyl group, an anthryl group, a phenanthryl group, a pyrenyl group, a chrysenyl group, a naphthacenyl group, and a fluorenyl group.

Among them, the aryl group constituting $R^4$, $R^5$, and $R^6$ is preferably a phenyl group. Accordingly, the gas selection ratio of carbon dioxide in the separation layer 3 can be particularly increased, and the gas permeability of carbon dioxide can be easily secured.

The number of carbon atoms in the alkyl group constituting $R^4$, $R^5$, and $R^6$ is not particularly limited, and is preferably 1 or more and 6 or less, and more preferably 2 or more and 5 or less. The alkyl group may be linear or branched. One or more hydrogen atoms contained in the alkyl group may be substituted with a substituent. Examples of the substituent include an alkoxy group, an alkenyloxy group, a phenyl group, a hydroxyl group, a carboxyl group, an amino group, a halogen atom, and a thiol group. When substituted with a plurality of substituents, the substituents may be the same type of substituents or different types of substituents.

Specific examples of the alkyl group include a methyl group, an ethyl group, a propyl group, an isopropyl group, an n-butyl group, an isobutyl group, a t-butyl group, a pentyl group, an isoamyl group, a hexyl group, a benzyl group, a phenylethyl group, a 2-phenylpropyl group, a trifluoropropyl group, a carboxymethyl group, an aminomethyl group, and a hydroxyalkyl group.

Examples of the hydroxyalkyl group include a hydroxymethyl group, a hydroxyethyl group, a hydroxypropyl group, a hydroxyisopropyl group, a hydroxybutyl group, a hydroxyisobutyl group, and a hydroxyt-butyl group.

All of $R^4$, $R^5$, and $R^6$ may represent an alkyl group.

$X^2$ represents a crosslinked chain containing a carboxylate ester bond, and is shared by two of the second b structural units. The carboxylate ester bond is a bond having a carboxylic anhydride structure represented by —CO—O—CO—. The carboxylate ester bond contains a double bond of C═O and has a good affinity with carbon dioxide.

The carboxylate ester bond may be directly bonded to Si atoms in the two second b structural units, or may be bonded via an alkylene group, an ether bond, a C═C bond, or the like. That is, the crosslinked chain $X^2$ may contain these groups together with the carboxylate ester bond. Further, the crosslinked chain $X^2$ may be a straight chain containing a carboxylate ester bond, or may be a branched chain containing a main chain containing a carboxylate ester bond and a side chain branched therefrom.

n in the formula (2a) and m in the formula (2b) are each set appropriately such that a weight average molecular weight of the organopolysiloxane is preferably 100 or more and 100,000 or less, and more preferably 1,000 or more and 30,000 or less.

At this time, a ratio of m/(n+m) in the formula (2a) and the formula (2b) is not particularly limited, and is preferably more than 0 and less than 0.1, more preferably 0.001 or more and less than 0.1, and still more preferably 0.01 or more and 0.05 or less. When the ratio of m/(n+m) is within the above range, a ratio of the crosslinked chain $X^2$ in the organopolysiloxane can be optimized. As a result, the gas permeability of the separation layer 3 can be ensured while improving the mechanical characteristics of the separation layer 3.

When the ratio of m/(n+m) is less than the lower limit value, a ratio of the second b structural unit in the organopolysiloxane decreases, and a ratio of the crosslinked chain $X^2$ decreases. Therefore, the mechanical characteristics of the separation layer 3 may decrease. On the other hand, when the ratio of m/(n+m) exceeds the upper limit value, the ratio of the second b structural unit in the organopolysiloxane increases, and the ratio of the crosslinked chain $X^2$ increases. Therefore, the gas permeability of the separation layer 3 may decrease.

Examples of a terminal of the group organopolysiloxane include an alkyl group, a hydroxyl group, and an alkoxy group. A bond * of the second a structural unit is bonded to a bond * of the second a structural unit, a bond * of the O atom or the Si atom contained in the second b structural unit, the terminal group, or other structural units. A bond * of the O atom or the Si atom in the second b structural unit is bonded to a bond * of the second a structural unit, a bond * of the O atom or the Si atom contained in the second b structural unit, the terminal group, or other structural units. A bond * of the crosslinked chain $X^2$ in the second b structural unit is bonded to the Si atom of another second b structural unit.

In the organopolysiloxane, a bonding mode of the second a structural unit and the second b structural unit may be any of random copolymerization, alternating copolymerization, block copolymerization, and the like. A total content of the second a structural unit and the second b structural unit in the organopolysiloxane is preferably 60% or more, and more preferably 80% or more in terms of molar ratio.

2.2. Method for Manufacturing Gas Separation Membrane

Next, a method for manufacturing the gas separation membrane according to the second embodiment will be described.

Figure 3:
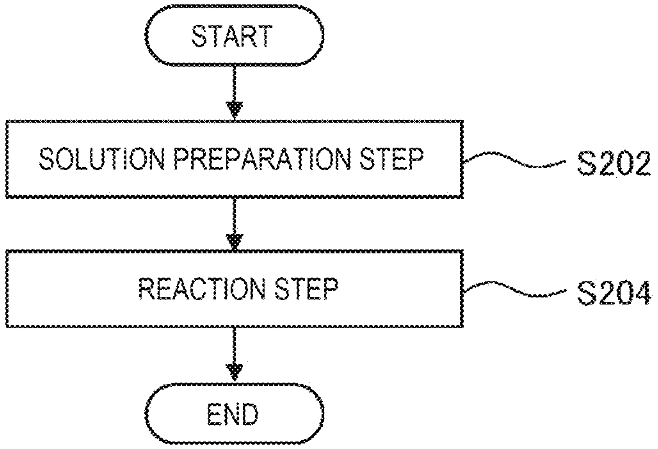
FIG. 3 is a process diagram showing a configuration of a method for manufacturing a gas separation membrane according to a second embodiment.

FIG. 3 is a process diagram showing a configuration of the method for manufacturing the gas separation membrane according to the second embodiment.

The manufacturing method shown in FIG. 3 includes a solution preparation step S202 and a reaction step S204.

2.2.1. Solution Preparation Step

In the solution preparation step S202, first, a phenyl-modified silicone and a solvent are mixed to prepare a solution. Examples of the solvent include alcohols such as methanol, ethanol, and propanol, and ethers such as diethyl ether, methyl tertiary butyl ether (MTBE), diisopropyl ether, and diphenyl ether.

The phenyl-modified silicone is a silicone having a phenyl group in a side chain. The phenyl-modified silicone contains a fourth a structural unit represented by the following formula (4a) and a fourth b structural unit represented by the following formula (4b).

(4a)

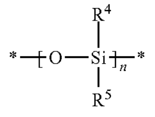

(4b)

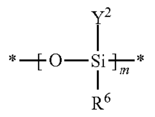

[In the formula (4a) and the formula (4b), one or more of $R^4$, $R^5$, and $R^6$ represent an alkyl group, and the rest represents an aryl group. $Y^2$ represents a phenyl group. * represents a bond. n and m are molar ratios of the fourth a structural unit and the fourth b structural unit.]

Such a phenyl-modified silicone is reacted in the reaction step S204 to be described later, the crosslinked chain $X^2$ containing a carboxylate ester bond is generated, and a crosslinked structure is generated via the crosslinked chain $X^2$. Accordingly, the separation layer 3 formed of the above-described organopolysiloxane can be formed.

In the formula (4a) and the formula (4b), $R^4$, $R^5$, and $R^6$ are the same as $R^4$, $R^5$, and $R^6$ in the formula (2a) and the formula (2b) described above.

n in the formula (4a) and m in the formula (4b) are each set appropriately such that a weight average molecular weight of the organopolysiloxane is preferably 100 or more and 100,000 or less, and more preferably 1,000 or more and 30,000 or less.

Further, a ratio of m/(n+m) is the same as in the case of the formula (2a) and the formula (2b). That is, the ratio of m/(n+m) in the formula (4a) and formula (4b) is not particularly limited, and is preferably more than 0 and less than 0.1, more preferably 0.001 or more and less than 0.1, and still more preferably 0.01 or more and 0.05 or less. When the ratio of m/(n+m) is within the above range, a ratio of the crosslinked chain $X^2$ in the generated organopolysiloxane can be optimized. As a result, the gas permeability of the separation layer 3 can be ensured while improving the mechanical characteristics of the separation layer 3.

When the ratio of m/(n+m) is less than the lower limit value, a ratio of a structure derived from the fourth b structural unit in the organopolysiloxane decreases, and the ratio of the crosslinked chain $X^2$ decreases. Therefore, the mechanical characteristics of the separation layer 3 may decrease. On the other hand, when the ratio of m/(n+m) exceeds the upper limit value, the ratio of the structure derived from the fourth b structural unit in the organopolysiloxane increases, and the ratio of the crosslinked chain $X^2$ increases. Therefore, the gas permeability of the separation layer 3 may decrease.

Examples of a terminal group of the phenyl-modified silicone include an alkyl group, a hydroxyl group, and an alkoxy group. A bond * of the fourth a structural unit is bonded to a bond * of the fourth a structural unit, a bond * of the fourth b structural unit, the terminal group, or other structural units. A bond * of the fourth b structural unit is bonded to a bond * of the fourth a structural unit, a bond * of the fourth b structural unit, the terminal group, or other structural units. A total content of the fourth a structural unit and the fourth b structural unit in the phenyl-modified silicone is preferably 60% or more, and more preferably 80% or more in terms of molar ratio.

2.2.2. Reaction Step

In the reaction step S204, the prepared solution is applied to one surface of the porous layer 2. Accordingly, a coated membrane is obtained.

Examples of a coating method include a dipping method, a dripping method, an inkjet method, a dispenser method, a spraying method, a screen printing method, a coater coating method, and a spin coating method.

Next, the coated membrane is dried. Thus, the separation layer 3 is obtained. The drying may be natural drying, forced drying, or drying using both. The natural drying is, for example, a method of leaving at room temperature for 1 hour or more. Examples of the forced drying include a method of heating at a temperature of 50° C. or higher and 250° C. or lower for 10 minutes or more, a method of placing a coated membrane under reduced pressure, and a method of spraying a gas.

Next, the dried coated membrane is put into a sealed container and subjected to an ozone treatment while being heated. Accordingly, an ozone oxidation reaction occurs on the phenyl group of the phenyl-modified silicone, and a benzene ring is cleaved to generate an aldehyde group. At least a part of the aldehyde group is further oxidized into a carboxyl group.

The carboxyl group generated in the fourth b structural unit causes a dehydration condensation reaction with the carboxyl group generated in another fourth h structural unit, the crosslinked chain $X^2$ containing a carboxylate ester bond is generated, and a crosslinked structure is generated via the crosslinked chain $X^2$. Accordingly, the separation layer 3 formed of the above-described organopolysiloxane can be formed.

The ozone treatment is a treatment of heating the coated membrane in the presence of ozone gas in a sealed container. A heating temperature is not particularly limited, and is preferably 30° C. or higher, more preferably 30° C. or higher and 80° C. or lower, and still more preferably 35° C. or higher and 60° C. or lower.

The ozone gas is supplied into the sealed container so as to have a predetermined concentration. An ozone concentration in the sealed container is not particularly limited, and is preferably 10 $g/Nm^3$ or more and 200 $g/Nm^3$ or less, and more preferably 50 $g/Nm^3$ or more and 100 $g/Nm^3$ or less. Accordingly, the ozone oxidation reaction can be caused for each phenyl group, and deterioration of characteristics of the organopolysiloxane due to an excessive ozone oxidation reaction can be prevented.

A flow rate of the ozone gas supplied into the sealed container is not particularly limited, and is preferably 100 ccm or more and 2000 ccm or less, and more preferably 300 ccm or more and 1000 ccm or less.

A time for performing the ozone treatment is appropriately set according to the heating temperature, the ozone concentration, and the like, and as an example, the time is preferably 10 minutes or more and 3 hours or less, and more preferably 30 minutes or more and 2 hours or less.

After the separation layer 3 is formed, a washing treatment may be performed as necessary. In the washing treatment, for example, a treatment of immersing the separation layer 3 in a washing liquid is used. Thereafter, the washing liquid is removed by drying.

As described above, the gas separation membrane 1 can be manufactured. Instead of the ozone treatment, other types of treatment capable of opening a benzene ring of the phenyl group, for example, ultraviolet irradiation, hydrogen peroxide processing, photocatalyst processing, or the like may be performed, or the treatments may be used in combination with the ozone treatment.

3. Use of Gas Separation Membrane

The gas separation membrane 1 according to the embodiment can be used for gas separation and collection, gas separation and purification, and the like. For example, the gas separation membrane 1 is used to efficiently separate carbon dioxide from a mixed gas containing gas components such as hydrogen, helium, carbon monoxide, carbon dioxide, hydrogen sulfide, oxygen, nitrogen, ammonia, sulfur oxide, nitrogen oxide, saturated hydrocarbons such as methane and ethane, unsaturated hydrocarbons such as propylene, and perfluoro hydrocarbons such as tetrafluoroethane. Accordingly, for example, the gas separation membrane 1 can be effectively used in a technique of separating and collecting carbon dioxide contained in the atmosphere (direct air collection (DAC)) or a technique of separating and collecting carbon dioxide from crude oil-associated gas or natural gas, whose main component is methane.

4. Effects of Embodiment

As described above, the gas separation membrane 1 according to the embodiment is a gas separation membrane for separating carbon dioxide from a mixed gas containing the carbon dioxide. The gas separation membrane contains an organopolysiloxane containing a first a structural unit represented by the following formula (1a) and a first b structural unit represented by the following formula (1b).

(1a)

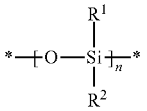

(1b)

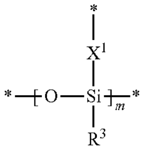

[In the formula (1a) and the formula (1b), $R^1$, $R^2$, and $R^3$ each independently represent a hydrogen atom, an alkyl group, an alkenyl group, an alkoxy group, an alkenyloxy group, an aryl group, or an aryloxy group. $X^1$ represents a crosslinked chain containing an amide bond, and is shared by two of the first b structural units. * represents a bond. n and m are molar ratios of the first a structural unit and the first b structural unit.]

According to such a configuration, the gas separation membrane 1 capable of achieving both gas selection ratio of carbon dioxide and gas permeability of carbon dioxide can be obtained. Since the separation layer 3 formed of the organopolysiloxane described above is excellent in mechanical characteristics, the separation layer 3 has both resistance to peeling and ability to follow deformation.

A ratio of m/(n+m) of the organopolysiloxane is preferably more than 0 and less than 0.1.

According to such a configuration, a ratio of the crosslinked chain in the organopolysiloxane can be optimized. As a result, the gas permeability of the separation layer 3 can be ensured while improving the mechanical characteristics of the separation layer 3.

The gas separation membrane 1 according to the embodiment is a gas separation membrane for separating carbon dioxide from a mixed gas containing the carbon dioxide. The gas separation membrane contains an organopolysiloxane containing a second a structural unit represented by the following formula (2a) and a second b structural unit represented by the following formula (2b).

(2a)

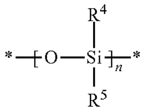

-continued (2b)

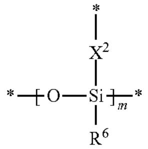

[In the formula (2a) and the formula (2b), one or more of $R^4$, $R^5$, and $R^6$ represent an alkyl group, and the rest represents an aryl group. $X^2$ represents a crosslinked chain containing a carboxylate ester bond, and is shared by two of the second b structural units. * represents a bond. n and m are molar ratios of the second a structural unit and the second b structural unit.]

According to such a configuration, the gas separation membrane 1 capable of achieving both gas selection ratio of carbon dioxide and gas permeability of carbon dioxide can be obtained. Since the separation layer 3 formed of the organopolysiloxane described above is excellent in mechanical characteristics, the separation layer 3 has both resistance to peeling and ability to follow deformation.

A ratio of m/(n+m) of the organopolysiloxane is preferably more than 0 and less than 0.1.

According to such a configuration, a ratio of the crosslinked chain in the organopolysiloxane can be optimized. As a result, the gas permeability of the separation layer 3 can be ensured while improving the mechanical characteristics of the separation layer 3.

The method for manufacturing the gas separation membrane 1 according to the embodiment is a method for manufacturing a gas separation membrane for separating carbon dioxide from a mixed gas containing the carbon dioxide. The method includes reacting an amino-modified silicone containing a third a structural unit represented by the following formula (3a) and a third b structural unit represented by the following formula (3b) with a dicarboxylic acid (the solution preparation step S102).

(3a)

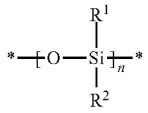

(3b)

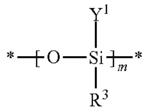

[In the formula (3a) and the formula (3b), $R^1$, $R^2$, and $R^3$ each independently represent a hydrogen atom, an alkyl group, an alkenyl group, an alkoxy group, an alkenyloxy group, an aryl group, or an aryloxy group. $Y^1$ represents an aminoalkyl group. * represents a bond. n and m are molar ratios of the third a structural unit and the third b structural unit.]

According to such a configuration, the gas separation membrane 1 capable of achieving both the gas selection ratio of carbon dioxide and the gas permeability of carbon dioxide can be manufactured. Since the aminoalkyl group is reacted with the dicarboxylic acid to form a crosslinked chain, the obtained separation layer 3 is excellent in mechanical characteristics, and has both resistance to peeling and ability to follow deformation.

The dicarboxylic acid preferably has 2 or more and 8 or less carbon atoms.

According to such a configuration, a length of the crosslinked chain can be optimized when a crosslinked structure is formed by crosslinking main chains of siloxane bonds via a crosslinked chain containing two amide bonds. As a result, the separation layer 3 that is excellent in mechanical characteristics and has both resistance to peeling and ability to follow deformation can be formed.

The reacting the amino-modified silicone with the dicarboxylic acid (the solution preparation step S102) may include an operation of adding a condensing agent.

According to such a configuration, a reaction temperature can be lowered and a reaction time can be shortened as compared with a case where the condensing agent is not used. As a result, for example, even when the reaction temperature is lowered to about room temperature, sufficient reaction efficiency can be obtained, and thus production efficiency of the separation layer 3 can be increased.

The method for manufacturing the gas separation membrane 1 according to the embodiment is a method for manufacturing a gas separation membrane for separating carbon dioxide from a mixed gas containing the carbon dioxide. The method includes reacting phenyl-modified silicones each containing a fourth a structural unit represented by the following formula (4a) and a fourth b structural unit represented by the following formula (4b) with each other (the reaction step S204).

(4a)

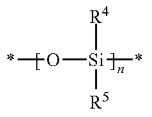

(4b)

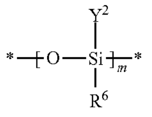

[In the formula (4a) and the formula (4b), one or more of $R^4$, $R^5$, and $R^6$ represent an alkyl group, and the rest represents an aryl group. $Y^2$ represents a phenyl group. * represents a bond. n and m are molar ratios of the fourth a structural unit and the fourth b structural unit.]

According to such a configuration, the gas separation membrane 1 capable of achieving both the gas selection ratio of carbon dioxide and the gas permeability of carbon dioxide can be manufactured. When the phenyl group is cleaved, the phenyl group is converted into a carboxyl group or the like, and a crosslinked chain is formed by a reaction between the carboxyl groups. The separation layer 3 thus obtained is excellent in mechanical characteristics, and has both resistance to peeling and ability to follow deformation.

The reacting the phenyl-modified silicones with each other (the reaction step S204) may include an operation of subjecting the phenyl-modified silicones to an ozone treatment.

According to such a configuration, an ozone oxidation reaction can be caused in the phenyl group of the phenyl-modified silicone, and a benzene ring can be cleaved to generate an aldehyde group. At least a part of the aldehyde group is further oxidized into a carboxyl group. Accordingly, the crosslinked chain can be efficiently generated.

Although the gas separation membrane and the method for manufacturing the gas separation membrane according to the present disclosure have been described above based on preferred embodiments, the present disclosure is not limited thereto.

For example, in the gas separation membrane according to the present disclosure, each part of the embodiments described above may be replaced with a component having a similar function, or any component may be added to the embodiments described above.

The method for manufacturing the gas separation membrane according to the present disclosure may be one in which any desired process is added to the above embodiments.

Example

Next, specific examples of the present disclosure will be described.

5. Preparation of Gas Separation Membrane 5.1. Sample No. 1

First, 50 mg of dicarboxylic acid was added to 50 g of ethanol to prepare a dicarboxylic acid-containing liquid.

Next, 1 g of amino-modified silicone was put into the dicarboxylic acid-containing liquid described above, followed by stirring. Thus, a solution for forming a separation layer was prepared.

Next, after 200 μL of the stirred solution was applied to one surface of a membrane filter serving as a porous layer, the membrane filter was left for 12 hours with an outer peripheral portion of the membrane filter floating.

Next, the membrane filter coated with the solution was put into a thermostatic chamber and subjected to a heat treatment at 200° C. for 2 hours.

Next, a washing treatment was performed, which after the membrane filter after the heat treatment was immersed in hexane for 10 minutes, the hexane was replaced with a new one, and the membrane filter was further immersed therein for another 10 minutes.

Next, the membrane filter after the washing treatment was sufficiently dried to obtain a gas separation membrane.

5.2. Sample Nos. 2 to 10

Gas separation membranes were obtained in the same manner as in the case of Sample No. 1 except that production conditions of the gas separation membranes were changed as shown in Table 1.

5.3. Sample Nos. 11 and 12

Gas separation membranes were obtained in the same manner as in the cases of Sample Nos. 1 and 3 except that use of dicarboxylic acid was omitted.

5.4. Sample No. 13

First, a phenyl-modified silicone and a solvent were mixed and stirred to prepare a solution. As the solvent, propanol was used.

Next, 200 μL of the prepared solution was applied to one surface of a membrane filter serving as a porous layer to obtain a coated membrane, and then the membrane filter was left for 12 hours with an outer peripheral portion of the membrane filter floating.

Next, the membrane filter with dried coated membrane formed was put in a sealed container, and subjected to an ozone treatment while being heated. A heating temperature was 40° C., an ozone concentration was 74 g/$Nm^3$, a flow rate was 500 ccm, and a treatment time was 1 hour.

Next, a washing treatment was performed, which after the membrane filter after the ozone treatment was immersed in hexane for 10 minutes, the hexane was replaced with a new one, and the membrane filter was further immersed therein for another 10 minutes.

Next, the membrane filter after the washing treatment was sufficiently dried to obtain a gas separation membrane.

5.5. Sample Nos. 14 to 24

Gas separation membranes were obtained in the same manner as in the case of Sample No. 13 except that production conditions of the gas separation membranes were changed as shown in Table 2.

In Tables 1 and 2, the gas separation membrane corresponding to the present disclosure is indicated as “Example”, and the gas separation membrane not corresponding to the present disclosure is indicated as “Comparative Example”. In Tables 1 and 2, symbols representing types of silicones correspond to the following compounds.

A-1: AMS-132 manufactured by Gelest, amine-modified silicone, weight average molecular weight 5000

A-2: KF-868 manufactured by Shin-Etsu Chemical Co., Ltd., amine-modified silicone, weight average molecular weight 5000

B-1: PMM-1015 manufactured by Gelest, phenyl-modified silicone, weight average molecular weight 1500

B-2: PMM-5021 manufactured by Gelest, phenyl-modified silicone, weight average molecular weight 2200

B-3: PMM-6021 manufactured by Gelest, phenyl-modified silicone, weight average molecular weight 3000

6. Evaluation of Gas Separation Membrane

The gas separation membranes of each Example and each Comparative Example were evaluated as follows.

6.1. Gas Permeability and Gas Selection Ratio of Carbon Dioxide

The gas separation membranes of each Example and each Comparative Example were cut into a circle having a diameter of 5 cm to prepare test samples. Next, using a gas permeability measuring device, a mixed gas obtained by mixing carbon dioxide:nitrogen at a volume ratio of 13:87 was supplied upstream of the test samples. A total upstream pressure was adjusted to 5 MPa, a partial pressure of carbon dioxide was adjusted to 0.65 MPa, a flow rate was adjusted to 500 mL/min, and a temperature was adjusted to 40° C. A gas component that permeated through the test sample was analyzed by gas chromatography.

Next, the gas permeability $R_{CO2}$ of carbon dioxide and the gas permeability $R_{N2}$ of nitrogen in the gas separation membrane were obtained from the analysis results, and the gas selection ratio $R_{CO2}/R_{N2}$ of carbon dioxide to nitrogen was calculated. The calculation results are shown in Tables 1 and 2.

6.2. Mechanical Characteristics

The gas separation membranes of each Example and each Comparative Example were bent into a bellows shape, and then the bent gas separation membranes were stretched. After the operation was repeated 10 times, the gas separation membrane was cut into a circular shape having a diameter of 5 cm to prepare a test sample.

Next, a gas selection ratio $R_{CO2}/R_{N2}$ of the test sample was calculated by the same method as in 6.1. Then, a difference between the gas selection ratio $R_{CO2}/R_{N2}$ before the bending test was performed and the gas selection ratio $R_{CO2}/R_{N2}$ after the bending test was performed was calculated as a decrease width of the gas selection ratio $R_{CO2}/R_{N2}$. The decrease width is an index quantitatively representing a degree of deterioration in gas selection ratio $R_{CO2}/R_{N2}$ due to the bending test. The mechanical characteristics of the gas separation membrane were e relatively evaluated by comparing the calculated decrease width with the following evaluation criteria. The evaluation results are shown in Tables 1 and 2.

A: The decrease width of the gas selection ratio is small (less than 3)

B: The decrease width of the gas selection ratio is moderate (3 or more and less than 6)

C: The decrease width of the gas selection ratio is large (6 or more)

TABLE 1

| | | Preparation condition of gas separation membrane | | | | | | | | | | Evaluation result of gas separation membrane | | |
|---|---|---|---|---|---|---|---|---|---|---|---|---|---|---|
| | | Separation layer | | | | | | | | | | Gas | Gas | Me- |
| | | Amino-modified silicone | | | Dicarboxylic acid | | | Porous layer | | | | perme- | selection | chanical |
| Sample No. | Classifi- cation | Type — | Amount to be used g | m/ (m + n) — | Type — | Amount to be used mg | Average thick- ness nm | Con- stituent material — | Average thick- ness μm | Thick- ness ratio % | | ability of carbon dioxide GPU | ratio of carbon dioxide — | char- acter- istic — |
| 1 | Example | A-1 | 1.0 | 0.02 | Adipic acid | 0.29 | 30 | Cellulose | 125 | 0.024 | | 234 | 23.4 | A |
| 2 | Example | A-4 | 1.0 | 0.02 | Adipic acid | 2.92 | 300 | Cellulose | 125 | 0.240 | | 25 | 6.0 | B |
| 3 | Example | A-2 | 1.0 | 0.02 | Succinic acid | 0.24 | 25 | Cellulose | 125 | 0.020 | | 83 | 13.8 | A |
| 4 | Example | A-2 | 1.0 | 0.02 | Adipic acid | 0.29 | 30 | Cellulose | 125 | 0.024 | | 198 | 24.8 | A |
| 6 | Example | A-2 | 1.0 | 0.02 | Sebacic acid | 0.40 | 40 | Cellulose | 125 | 0.032 | | 315 | 9.3 | A |
| 7 | Example | A-2 | 1.0 | 0.01 | Adipic acid | 0.15 | 15 | Cellulose | 125 | 0.012 | | 254 | 21.1 | A |
| 8 | Example | A-2 | 1.0 | 0.04 | Adipic acid | 0.59 | 60 | Cellulose | 125 | 0.048 | | 145 | 29.0 | A |
| 9 | Example | A-2 | 1.0 | 0.10 | Adipic acid | 1.46 | 150 | Cellulose | 125 | 0.120 | | 108 | 27.0 | A |

TABLE 1-continued

| | | Preparation condition of gas separation membrane | | | | | | | | | Evaluation result of gas separation membrane | | |
|---|---|---|---|---|---|---|---|---|---|---|---|---|---|
| | | Separation layer | | | | | | | | | Gas | Gas | Me- |
| | | Amino-modified silicone | | | Dicarboxylic acid | | | Porous layer | | | perme- | selection | chanical |
| Sample No. | Classification | Type — | Amount to be used g | m/(m + n) — | Type — | Amount to be used mg | Average thickness nm | Constituent material — | Average thickness µm | Thickness ratio % | ability of carbon dioxide GPU | ratio of carbon dioxide — | characteristic — |
| 10 | Example | A-2 | 1.0 | 0.20 | Adipic acid | 2.92 | 300 | Cellulose | 125 | 0.240 | 18 | 4.5 | B |
| 11 | Comparative Example | A-1 | 1.0 | 0.02 | — | — | 300 | Cellulose | 125 | 0.240 | 22 | 4.0 | C |
| 12 | Comparative Example | A-2 | 1.0 | 0.02 | — | — | 300 | Cellulose | 125 | 0.240 | 15 | 3.0 | C |

As is clear from Table 1 and Table 2, it was confirmed that the gas separation membranes of Examples were excellent in mechanical characteristics and achieved both gas selection ratio of carbon dioxide and gas permeability of carbon dioxide, as compared with the gas separation membranes of Comparative Examples.

TABLE 2

| | | Preparation condition of gas separation membrane | | | | | | | | Evaluation result of gas separation membrane | | |
|---|---|---|---|---|---|---|---|---|---|---|---|---|
| | | Separation layer | | | | | | | | Gas | Gas | Me- |
| | | Phenyl-modified silicone | | | | | Porous layer | | | perme- | selection | chanical |
| Sample No. | Classification | Type — | Amount to be used g | m/(m + n) — | Ozone treatment — | Average thickness nm | Constituent) material — | Average thickness µm | Thickness ratio % | ability of carbon dioxide GPU | ratio of carbon dioxide — | characteristic — |
| 13 | Example | B-1 | 1.0 | 0.02 | Yes | 5 | Cellulose | 75 | 0.007 | 14000 | 22.5 | A |
| 14 | Example | B-1 | 3.0 | 0.02 | Yes | 15 | Cellulose | 75 | 0.020 | 4000 | 20.6 | A |
| 15 | Example | B-1 | 10.0 | 0.02 | Yes | 100 | Cellulose | 75 | 0.133 | 1540 | 18.5 | B |
| 16 | Example | B-2 | 1.0 | 0.04 | Yes | 5 | Cellulose | 75 | 0.007 | 4530 | 24.8 | A |
| 17 | Example | B-2 | 3.0 | 0.04 | Yes | 15 | Cellulose | 75 | 0.020 | 1200 | 22.7 | A |
| 18 | Example | B-2 | 10.0 | 0.04 | Yes | 100 | Cellulose | 75 | 0.133 | 450 | 20.1 | B |
| 19 | Example | B-3 | 1.0 | 0.05 | Yes | 5 | Cellulose | 75 | 0.007 | 1540 | 29.0 | A |
| 20 | Example | B-3 | 3.0 | 0.05 | Yes | 15 | Cellulose | 75 | 0.020 | 430 | 27.3 | A |
| 21 | Example | B-3 | 10.0 | 0.05 | Yes | 100 | Cellulose | 75 | 0.133 | 120 | 25.6 | B |
| 22 | Comparative Example | B-1 | 10.0 | 0.02 | No | 5 | Cellulose | 75 | 0.007 | 105 | 2.5 | C |
| 23 | Comparative Example | B-2 | 10.0 | 0.02 | No | 15 | Cellulose | 75 | 0.020 | 60 | 3.0 | C |
| 24 | Comparative Example | B-3 | 10.0 | 0.02 | No | 100 | Cellulose | 75 | 0.133 | 24 | 4.0 | C |

What is claimed is:

1. A gas separation membrane for separating carbon dioxide from a mixed gas containing the carbon dioxide, the gas separation membrane comprising:

an organopolysiloxane containing a first a structural unit represented by the following formula (1a) and a first b structural unit represented by the following formula (1b), (1a)

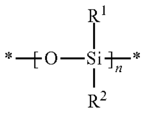

-continued (1b)

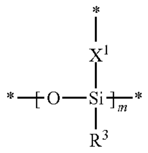

wherein, in the formula (1a) and the formula (1b), $R^1$, $R^2$, and $R^3$ each independently represent a hydrogen atom, an alkyl group, an alkenyl group, an alkoxy group, an alkenyloxy group, an aryl group, or an aryloxy group;

$X^1$ represents a crosslinked chain containing an amide bond, and is shared by two of the first b structural units;

* represents a bond; and n and m are molar ratios of the first a structural unit and the first b structural unit.

2. The gas separation membrane according to claim 1, wherein a ratio of m/(n+m) of the organopolysiloxane is more than 0 and less than 0.1.

3. A gas separation membrane for separating carbon dioxide from a mixed gas containing the carbon dioxide, the gas separation membrane comprising:

an organopolysiloxane containing a second a structural unit represented by the following formula (2a) and a second b structural unit represented by the following formula (2b), (2a)

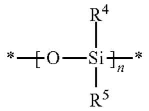

(2b)

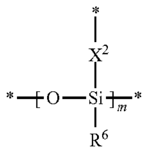

wherein, in the formula (2a) and the formula (2b), one or more of $R^4$, $R^5$, and $R^6$ represent an alkyl group, and the rest represents an aryl group;

$X^2$ represents a crosslinked chain containing a carboxylate ester bond, and is shared by two of the second b structural units;

* represents a bond; and n and m are molar ratios of the second a structural unit and the second b structural unit.

4. The gas separation membrane according to claim 3, wherein a ratio of m/(m+n) of the organopolysiloxane is more than 0 and less than 0.1.

5. A method for manufacturing a gas separation membrane for separating carbon dioxide from a mixed gas containing the carbon dioxide, the method comprising:

reacting an amino-modified silicone containing a third a structural unit represented by the following formula (3a) and a third b structural unit represented by the following formula (3b) with a dicarboxylic acid, (3a)

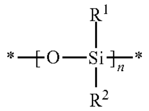

-continued (3b)

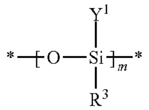

wherein, in the formula (3a) and the formula (3b), $R^1$, $R^2$, and $R^3$ each independently represent a hydrogen atom, an alkyl group, an alkenyl group, an alkoxy group, an alkenyloxy group, an aryl group, or an aryloxy group;

$Y^1$ represents an aminoalkyl group;

* represents a bond; and n and m are molar ratios of the third a structural unit and the third b structural unit.

6. The method for manufacturing a gas separation membrane according to claim 5, wherein the dicarboxylic acid has 2 or more and 8 or less carbon atoms.

7. The method for manufacturing a gas separation membrane according to claim 5, wherein the reacting the amino-modified silicone with the dicarboxylic acid includes an operation of adding a condensing agent.

8. A method for manufacturing a gas separation membrane for separating carbon dioxide from a mixed gas containing the carbon dioxide, the method comprising:

reacting phenyl-modified silicones each containing a fourth a structural unit represented by the following formula (4a) and a fourth b structural unit represented by the following formula (4b) with each other, (4a)

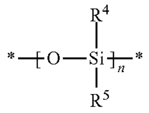

(4b)

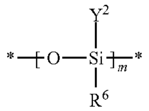

wherein, in the formula (4a) and the formula (4b), one or more of $R^4$, $R^5$, and $R^6$ represent an alkyl group, and the rest represents an aryl group;

$Y^2$ represents a phenyl group;

* represents a bond; and n and m are molar ratios of the fourth a structural unit and the fourth b structural unit.

9. The method for manufacturing a gas separation membrane according to claim 8, wherein the reacting the phenyl-modified silicones with each other includes an operation of subjecting the phenyl-modified silicones to an ozone treatment.

* * * * *